A. KRUMHOLZ.
METAL JOINT AND METHOD OF WELDING THE SAME.
APPLICATION FILED DEC. 19, 1917.
1,268,980.
Patented June 11, 1918.
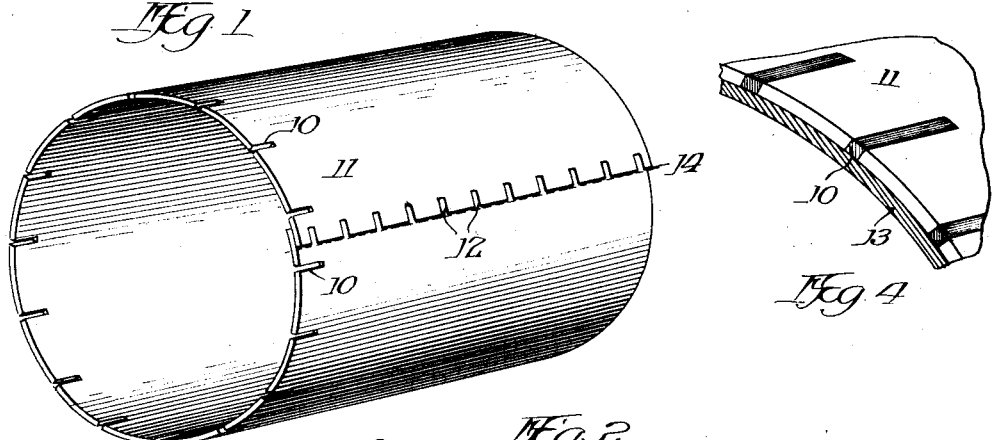
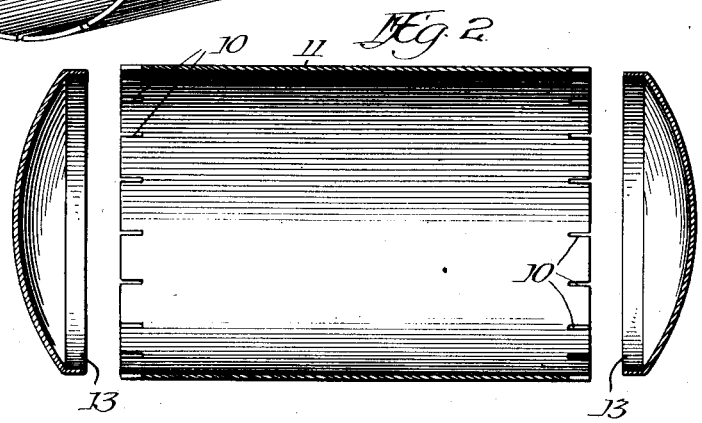
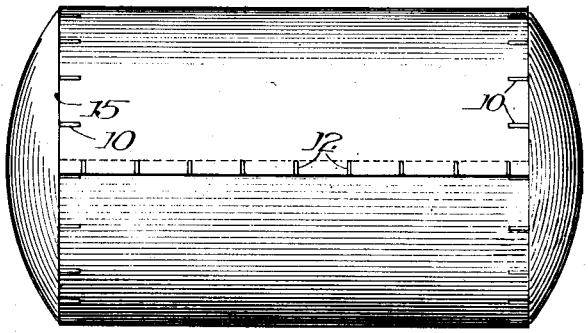

UNITED STATES PATENT OFFICE.

AUGUST KRUMHOLZ, OF CHICAGO, ILLINOIS.

METAL JOINT AND METHOD OF WELDING THE SAME.

1,268,980.     Specification of Letters Patent.     Patented June 11, 1918.

Application filed December 19, 1917. Serial No. 207,811.

*To all whom it may concern:*

Be it known that I, AUGUST KRUMHOLZ, a citizen of the United States, and resident of Chicago, in the county of Cook and State of Illinois, have invented certain new and useful Improvements in Metal Joints and Methods of Welding the Same, of which the following is a specification.

My invention relates to a method of welding metallic joints. This method is an improvement on the method of my application, Serial Number 54,769, filed October 8, 1915. However, practical difficulties were encountered in interfitting the notched ends of the plates and I have conceived the idea that equally desirable results may be secured in a construction having overlapped edges. It is now common to form tanks and cylinders by the process of welding, but difficulty has been experienced in effecting a weld which will not give way at high pressures. For instance, in certain types of tanks it is desirable and necessary that the walls thereof should withstand a pressure of at least three hundred or more pounds per square inch. It has not heretofore been possible to produce a welded joint which would uniformly withstand such pressure. The metal composing such a tank is of comparatively thin gage and, therefore, the area of weld has not been sufficient to prevent breakage along the line of the joint.

I have conceived the idea that a strong and efficient joint may be secured by providing an increased area along the line of the weld, to the end that the resistance of the joint will be substantially equal to that of the metal at points other than at the joint.

One reason for the efficiency of the construction described and shown is in that a large portion of the area of the joint is in shear instead of in tension, and as the resistance to shear is considerably greater than the resistance of a joint to parting under tension, the strength of the joint is increased proportionately.

It has been found in practice that a tank, the walls of which are joined in the manner shown in the drawings, is of greatly increased strength and will not give way at pressure exceeding five hundred pounds per square inch. In other words, the joint has been found to be of substantially equal resistance to that of the metal composing the tank.

The method will be more readily understood by reference to the accompanying drawings in which, Figure 1 is a perspective view of a shell prepared for the carrying out of my invention;

Fig. 2 is a sectional view through such a shell and through two heads adapted to be secured to the shell;

Fig. 3 is a side elevation of a tank or drum constructed in accordance with my method, and, Fig. 4 is an enlarged perspective view showing the manner of uniting the shell and head.

In order to practise my novel method it is desirable first to provide a plurality of narrow slits 10 in the marginal edges of one of the plates, such as indicated by the numeral 11. These slits will be suitably spaced, the spacing being optional and depending upon the pressure to which the tank is to be subjected. The slits will preferably be of a width corresponding substantially to the thickness of the plate or sheet. If the side seam is to be united in the same manner similar slits 12 will be made therein. The length of the slits will be substantially equal to the overlapping of the plates at their marginal edges. It will, of course, be understood that the invention may be employed to advantage for uniting an edge or portion of a plate on to a surface, the same principles applying as when the overlapped edges of two plates are to be joined.

The heads or ends are constructed to provide the continuous lateral flange 13 which preferably fits within the open end of the shell. It will be noted that the slits 10 are of a length substantially equal to the width of the flange 13. When the overlapped marginal edges of the shell 11 have been suitably clamped in the desired position, a weld is formed along the line 14; that is, in a continuous line parallel to the seam. The next step is to weld in the slits 12, the edges of the metal which outline the slit being welded to the underlying plate. The slits are filled with the welding metal leaving a comparatively smooth and uninterrupted surface. The heads of the cylinder are next applied and the welding continued in the same manner; that is, a weld is first made along the edge 15 shown in Fig. 3 whereupon the slits are filled with the welding metal.

The result following the practice of this method is that great strength is secured, due to the fact that much of the weld is in shear, or in other words, the extent of metal which must be sheared before failure is equal to the length of the slits instead of only the width of the weld at the seam. This results in the production of my extremely strong and rigid joint.

I claim:

1. The method of joining metallic plates which consists in providing spaced, narrow slits in one of the overlapped portions of a joint, then welding along the extremity of the exposed edge, then welding at the slits, substantially as described.

2. The method of joining plates which consists in providing spaced slits in one margin of a plate superposing said margin on the object to which it is to be joined, welding along the exterior seam, and then welding at the slits, substantially as described.

3. The method of joining plates which consists in providing spaced slits in one margin of a plate, superposing said margin on the object to which it is to be joined, welding along the exterior seam, and then welding at the slits, and filling the slits with metal, substantially as described.

4. The method of uniting the overlapped marginal edges of plates which consists in welding in a continuous line parallel to the seam and then welding along a plurality of spaced lines, perpendicular to said continuous line, substantially as described.

5. The method of welding plates which consists in slitting one marginal edge of a plate lapping said edge over a surface to which it is to be welded, welding along a continuous line parallel to and at the extremity of said slitted edge, then welding along a series of perpendicular lines at said slits, substantially as described.

6. The method of uniting sheets or plates which consists in providing in the margin of one plate a series of slits of a width corresponding substantially to the thickness of the sheet or plate, then lapping said margin over a second margin, then welding at the extremity and along the slits of said first margin, substantially as described.

7. A welded joint comprising superposed plates the marginal edge of one of which is provided with spaced notches, the plates being welded along the exterior seam and along the edges of the notches, substantially as described.

8. A welded joint comprising superposed plates the marginal edge of one of which is provided with spaced notches, the plates being welded along the exterior seam and along the edges of the notches, the notches being filled with fused metal to present a smooth surface, substantially as described.

9. A welded joint comprising the lapped marginal edges of plates or sheets to be joined, one of said edges being provided with notches of a width substantially equal to the thickness of the plate, the extremities of the plates being welded along the exterior seam and welded among the line of the notches, and fused metal filling said notches to present a smooth surface, substantially as described.

10. A joint consisting of the over-lapped marginal edges of the plates to be joined, one of said plates being provided at its margin with spaced slits of a width substantially equal to the thickness of the plate of a depth substantially equal to the extent of over-lap, the plates being welded along the exterior seam and along the line of the notches, substantially as described.

Signed at Chicago, Illinois, this 20th day of March, A. D. 1917.

AUGUST KRUMHOLZ.

Witnesses:
OTTO KUBAT,
TOM MADSON.